Feb. 4, 1936. L. A. ANGUS 2,029,850
CARBURETTED WATER GAS PROCESS
Filed May 26, 1932
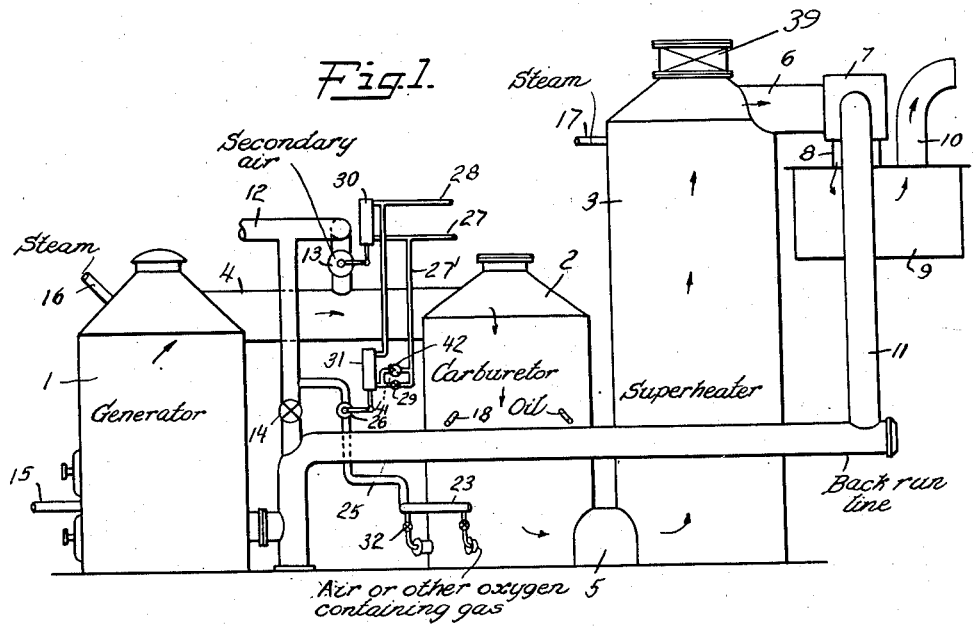
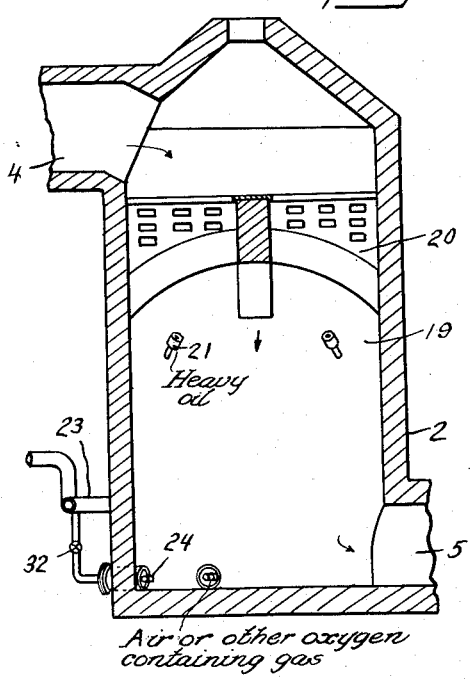
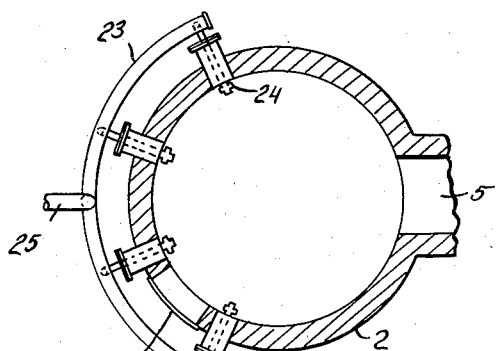
INVENTOR
Leslie A. Angus
BY
ATTORNEY Patented Feb. 4, 1936

2,029,850

UNITED STATES PATENT OFFICE 2,029,850

CARBURETTED WATER GAS PROCESS

Leslie Alvin Angus, Owosso, Mich., assignor to Semet-Solvay Engineering Corporation, New York, N. Y., a corporation of New York Application May 26, 1932, Serial No. 613,657

2 Claims. (Cl. 48—205)

This invention relates to the production of carburetted water gas and is especially concerned with the design and operation of the carburetor unit.

One of the objects of the invention is to provide a novel method for the removal of carbonaceous deposits from the carburetor.

A further object of the invention is to provide a self-cleaning carburetor whereby oils which leave large carbon residues may be used without the necessity of frequent interruption of carburetor operation for the purpose of scraping out or otherwise removing such residues.

In usual practice for the production of carburetted water gas, there is employed a water gas set comprising a generator, carburetor, and superheater connected in series. The gas making operation is usually conducted as a cyclic process comprising a "blast" period in which carbonaceous fuel is heated to a high temperature by the introduction of air thereinto and a "make" period in which steam is introduced into this highly heated fuel, reacting therewith to form water gas. In the normal operation of the carburetted water gas set the hot bed of carbonaceous fuel, such as coke or coal, is blasted with air or other oxygen-containing gas to raise the temperature of the fuel bed to water gas making temperatures. The gases resulting from this operation, i. e., the blast gases, are conducted from the top of the generator, mixed with secondary air, and are passed into the top of the carburetor where the combustible constituents thereof are burned to heat the refractory material contained in the carburetor. The hot gases pass down through the carburetor, out at the base thereof to the superheater. They then pass upwardly through the superheater, yielding their heat content to the refractory material of this regenerator, and finally pass off at the top of the superheater.

When the fuel bed in the generator has attained a sufficient temperature to effect the production of water gas, the introduction of air is discontinued and steam is introduced into the base of the generator and passed up through the fuel bed therein. The resultant water gas is passed into the carburetor where it is intimately contacted with an enriching oil which is vaporized by the intense heat of the gases and refractory surfaces. In addition to the vaporization of the enriching oil, a partial cracking thereof takes place in the carburetor with the resultant formation of carbon which generally deposits on the refractory surfaces contained in the carburetor. The gases containing vaporized oil are then conducted to the superheater where further cracking or fixing of the vapors takes place, resulting in the formation of permanent gases, thus increasing the calorific value and illuminating power of the gases. The uprun steam step may be followed by a downrun step in which steam is passed through the superheater and carburetor, or directly into the top of the generator, passed down through the fuel bed, the resultant water gas being withdrawn from the base of the generator.

Various hydrocarbon oils may be used for enriching the water gas. Certain oils, otherwise advantageous for the purpose, produce excessive amounts of carbonaceous residue, and with these oils it has been found advisable to employ a special carburetor designed in such a manner that the carbon formed will not clog the gas passages but will drop to the floor thereof and may then be removed at desired intervals by scraping, etc. Such special carburetors are described and claimed in copending applications of Charles F. Hughes, Serial Nos. 542,270; 542,271; and 577,218, filed June 5, 1931; June 5, 1931; and November 25, 1931, respectively. Oils which have been found especially troublesome in this respect are the heavy oils, such as crude oils and Bunker-C oils. Although these oils may be used satisfactorily in properly designed carburetors, nevertheless their use entails frequent cleaning of the carburetor floor and consequent interruption of the gas making process.

I have found that if air or other gas, which will react with carbon at the high temperatures prevailing in the carburetor to form a gaseous product, is admitted to the lower portion of the carburetor during the flow of the hot blast gases therethrough, the deposits of carbon will be readily burned so that cleaning or scraping is unnecessary. By the provision of automatic means for controlling the introduction of the air or other oxygen-containing gas to the base of the carburetor, the carburetor becomes self-cleaning and no further attention need be paid to the removal of carbon therefrom than an occasional inspection to ascertain that the apparatus is in proper adjustment. In accordance with my invention, the air or other oxygen-containing gas is admitted to the base of the carburetor during the blasting step and subsequent to the introduction of secondary air into the top of the carburetor, thus eliminating explosion hazards.

My invention may be more fully understood from a consideration of the following description of a specific embodiment thereof taken in connection with the accompanying drawing, in which—

Fig. 1 is a side elevation of a water gas set including a carburetor equipped in accordance with my invention;

Fig. 2 is a vertical section through the carburetor of Fig. 1; and

Fig. 3 is a horizontal section taken through the lower portion of Fig. 2.

Referring especially to Fig. 1 of the drawing, there is shown a water gas set comprising a generator 1, a carburetor 2, and a superheater 3. A conduit 4 connects the top of the generator 1 with the top of the carburetor 2, and a conduit 5 connects the bottom of the carburetor 2 to the bottom of superheater 3. The superheater 3 is connected at the top by conduit 6 to a housing 7 within which may be provided a suitable valve for reversing flow through the water gas set according to the usual practice. The housing 7 is connected by a conduit 8 to a water seal or wash box 9. A conduit 10 leads from the wash box to a gas holder or gas purification apparatus (not shown).

In the apparatus shown in the drawing, an additional conduit 11 connects the housing 7 with the base of the generator 1. An air line 12 serves for the admission of secondary air to the conduit 4 and primary air to the base of generator 1, the passage of air being suitably controlled by valves 13 and 14. Steam connections 15, 16, and 17 are provided for the admission of steam into the generator either below or above the fuel bed or into the top of the superheater.

The carburetor 2 shown in the drawing as being of the ignition arch type described and claimed in Hughes' application Serial No. 542,271, is especially adapted for the use of crude oils that leave large carbon deposits. This carburetor comprises a refractorily lined chamber 19 provided with arches 20 of refractory material supported well above the floor of the chamber and bonding with the refractory lining of the carburetor. Suitable connections 18 are disposed in the side of the carburetor for the introduction of an enriching or carburetting oil. Spray heads 21, at the ends of pipes or connection 18, are provided for the introduction of the enriching liquid. The space between the floor of the carburetor and the arches 20 is substantially unobstructed so that it constitutes a settling chamber for carbon formed by the cracking of the enriching oil. The carburetor may be provided with a door 22 (Fig. 3) for gaining access to the interior for cleaning, repairing, etc.

Near the base of the carburetor 2 there is provided a manifold 23 communicating with a number of nozzles 24 projecting through suitable stuffing boxes preventing leakage of gas out of the carburetting chamber just above the floor thereof. The manifold 23 is connected by a pipe 25 to the air line 12, although, as will be apparent, it may, if desired, be connected to any suitable supply of oxygen-containing gas. Flow through pipe 25 may be controlled by a valve 26 which may be automatically operated for regulating the air flow. This valve may be controlled advantageously by the same control mechanism as the carburetor blast valve 13. It is desirable that the blast valve 13 reach its fully open position somewhat ahead of valve 26. When hydraulic operating means are provided for these valves, the actuating fluid being supplied from a common source through supply lines 27 and 28, the above result may be attained by employing a suitable adjusting valve or needle valve 29 in the line 27 for the pressure fluid which operates to open and close valve 26. Pipe 41, having check valve 42 therein, permitting flow of pressure fluid from hydraulic cylinder 31 through line 27 by-passes valve 29. Valves 13 and 26 are preferably operated by pistons in hydraulic cylinders 30 and 31 respectively. It will thus be seen that by suitable adjustment of valve 29 the rate of flow of the liquid operating the piston in cylinder 31 may be controlled to operate valve 26 somewhat slower than valve 13 so that the latter valve is completely opened before valve 13. Upon operation of the hydraulic cylinder 31 to close valve 26, the pressure fluid by-passes needle valve 29 through check valve 42, causing prompt closing of valve 26. Of course, any other suitable means, such for example as the valve mechanism of the application of Sybren R. Tymstra, Serial No. 349,381, filed March 23, 1929, may be employed for actuating valve 26.

Referring to the sectional view of Figs. 2 and 3, it will be noted that nozzles 24 are so positioned about the carburetor chamber that the injected air is well distributed over the surface of the floor. Since the flow of blast gases in the carburetor is in the direction of the conduit 5, it is preferable to place the air nozzles on the opposite side of the carburetor chamber so that the sweeping effect of the blast gases may be utilized to advantage to secure uniform distribution of the air supplied. In order to secure individual adjustment of the nozzles 24, they each may be provided with an operating valve 32. By suitable regulation of these valves, the distribution of air in the carburetor may be accurately controlled so that a substantially complete removal of carbon may be effected.

The above apparatus may be operated for the production of water gas in the following manner. Assuming that the fuel bed has been heated to incandescence, an uprun gas making step is commenced, the steam being introduced into the highly incandescent fuel bed of the generator 1 by means of steam connection 15. The resultant blue gas or water gas passes from the generator through conduit 4 to the top of carburetor 2, down through the carburetor 2 to the outlet 5, and thence up through the superheater 3 to the housing 7 and washbox 9 as indicated by arrows on Fig. 1. During this operation, air valves 13, 14, and 26 are closed. The valve in housing 7 is so set as to permit flow of gas from the superheater 3 to the washbox 9, but prevent gas flow through conduit 11. During this uprun period, enriching oil is introduced through connections 18 and spray nozzles 21 into the carburetor 2, where it is vaporized and partially cracked by the hot gases and the heat stored in the carburetor, resulting in the enrichment of the gas with oil vapors and at the same time in the formation of a carbonaceous residue which settles out of the gases onto the floor of the carburetor.

After the uprun period has continued for a predetermined time, the supply of steam at 15 is shut off and the supply at 17 or 16 turned on. The valve mechanism in the housing 7 is now set so that conduit 11 communicates with washbox 9, the superheater being disconnected therefrom. In this manner the flow of gas is reversed. If the steam is admitted at 17, it is preheated in the superheater and carburetor, and enters the generator at the top thereof, flowing down through the hot fuel, and the water gas so produced passes through conduit 11 to the washbox 9. If the steam is admitted into the generator through pipe 16, it passes down through the fuel bed therein, reacting therewith to form water gas which is withdrawn from the base of the generator through pipe 11 and passes into the washbox 9.

When the fuel temperature has been reduced by the passage of steam therethrough so that the efficient production of water gas may no longer be effected, the steam supply is cut off. The stack valve 39 of the superheater and valve 14 are now opened and the fuel bed blasted to incandescence. The blast gases pass from the top of the generator into the carburetor, down through the carburetor and up through the superheater. At the beginning of this blast period valve 13 is opened to admit secondary air into the blast gases passing into the carburetor, the mixture of air and blast gases being ignited upon contact with the checkerbrick 40 and arches 20 in the top of the carburetor, resulting in the combustion of the gases therein and the heating of both the carburetor and the superheater. The valve 13, as previously noted, is operated by the piston in the valve operating hydraulic cylinder 30. The opening of valve 13 is accomplished by applying pressure fluid through the line 27 to one side of the piston in cylinder 30, the pressure fluid on the other side being discharged through the line 28. Pressure fluid is simultaneously applied to the piston in cylinder 31 controlling the valve 26. Due to the needle valve 29 in line 27', flow of pressure fluid to cylinder 31 is restricted so that the opening of valve 26 is delayed so that it reaches its fully open position somewhat after valve 13 is fully opened.

The operation of valves 26 and 13 in the manner hereinabove described eliminates explosion hazards. The air introduced through valve 13 and the blast gases passing from the generator into the carburetor are admixed and ignited upon passage over checker-brick 40 and arches 20. The resultant gases pass through the unobstructed portion of the carburetor into the superheater, leaving the superheater through blast valve 39. If air were admitted into the base of the carburetor through valve 26 before the secondary air was introduced into the top of the carburetor through valve 13, there would be the danger of the formation of an explosive mixture in the carburetor. By igniting the incoming blast gases admixed with secondary air at the top of the carburetor and introducing the air or other oxygen-containing gas for effecting removal of carbonaceous deposits at the base of the carburetor after the introduction of secondary air into the top of the carburetor, this danger is eliminated.

It will be noted that air or other oxygen-containing gas is thus supplied not only at the top of the carburetor 2 for admixture with the entering blast gases, but also at the bottom of the carburetor in direct contact with the carbonaceous deposit to oxidize the hot carbonaceous deposits and convert them to gaseous products which are carried along and exhausted with the blast gases. The admission of air at the base of the carburetor may be continued during the entire blast period.

When the fuel bed has been reheated to a sufficient temperature to effect the satisfactory formation of water gas, the air valve 14 is closed and pressure fluid supplied to the hydraulic line 28 closing valves 13 and 26. The valve in the housing 7 is again set for the uprun period, steam is introduced at 15, and an enriching oil at 18 as hereinabove described. Although no special mechanism has been shown in connection with the above apparatus for operating the various valves other than the air valves 13 and 26, it will, of course, be understood that these valves like the air valves 13 and 26 may be operated by hydraulic cylinders or other motors and operation of all the valves may be controlled from the usual control nest with which water gas sets are equipped.

By the above process, carbon residue deposited in the carburetor during the carburetted water gas making periods is substantially completely removed during the blast period. Thus, there is no accumulation of carbon such as to require cleaning of the carburetor floor as has been previously the case in operating gas sets with enriching liquids which formed excessive carbon residue. Further, the hot carbonaceous deposits are burned and the resultant heat utilized to heat the superheater and may be utilized to generate steam by passing the blast gases and the gases resulting from the combustion of the carbonaceous deposits through a waste heat boiler or regenerator connected with the superheater.

Although I have described one specific embodiment of my invention, it is to be understood that I do not wish to be limited thereto since other methods of operation are within the purview of my invention. The introduction of oxygen-containing gas may be continued, for example, only for a portion of the blast period. Instead of air, other combustion supporting gases may be employed. It may be desirable in some cases to use a gas enriched in oxygen in order to secure a more rapid removal of the carbon deposits. In this case, the quantity of the gas and therefore its cooling effect on the carbon deposits would be less and the combustion of carbon would take place considerably more rapidly.

Although I have described my invention as being particularly adapted for use with the ignition arch type of carburetor operating with the crude oil or Bunker-C oil as an enriching liquid, it will be understood that the invention is equally applicable to any type of carburetor on the floor of which substantial deposits of carbonaceous residue are formed. Since the rate and duration of the air flow may be controlled as desired, it is obvious that the apparatus may be adjusted to suit various conditions of operation.

I claim:

1. The method of operating a water gas set involving a carburetor through which are passed blast gases admixed with an oxygen-containing gas alternately with the passage of water gas which is enriched with oil forming carbonaceous deposits which comprises burning the blast gases in the carburetor during the blasting step and concurrently with the burning of the blast gases effecting removal of the carbonaceous deposits formed in a preceding water gas making step by introducing additional oxygen-containing gas in contact therewith and during the succeeding water gas making step adding oil to the water gas, the cracking of the oil in the water gas making step and the removal of the carbonaceous deposits being accomplished without the introduction of extraneous fuel into the carburetor and so as to avoid the maintenance of a substantial body of arbonaceous deposits therein.

2. In the method of operating a carburetted water gas set, including a water gas generator having a bed of fuel therein and a carburetor having the base portion thereof substantially unobstructed and in which during the blasting step the blast gases from the generator admixed with an oxygen-containing gas are passed through the carburetor and during the carburetted water gas making step steam is passed through the fuel bed in the generator and the resultant water gas passed downwardly through the carburetor and enriched with crude oil introduced into the carburetor in an upward direction into the downflowing water gas stream passing therethrough and the carbonaceous deposits resulting from the decomposition of the oil settle to the base of the carburetor, the improvement which comprises removing the carbonaceous deposits from the base of the carburetor by introducing additional oxygen-containing gas into direct contact therewith during the passage of the blast gases through the carburetor, the removal of the carbonaceous deposits and the decomposition of the oil in the carburetted water gas making step being accomplished without the introduction of extraneous fuel into the carburetor and so as to avoid the maintenance of a substantial body of carbonaceous deposits therein.

LESLIE ALVIN ANGUS.